United States Patent [19]

Morin et al.

[11] Patent Number: 4,994,518

[45] Date of Patent: Feb. 19, 1991

[54] THERMOTROPIC POLYMER/INORGANIC REINFORCING FILLER MOLDING COMPOSITIONS

[75] Inventors: Alain Morin; Jean-Pierre Quentin, both of Lyon, France

[73] Assignee: Rhone-Poulenc Chimie, Courbevoie, France

[21] Appl. No.: 379,371

[22] Filed: Jul. 13, 1989

[30] Foreign Application Priority Data

Jul. 13, 1988 [FR] France .................. 88 09768

[51] Int. Cl.$^5$ .................. C08K 3/34; C08K 7/00; C08K 9/06; C08L 67/00
[52] U.S. Cl. .................. 524/449; 524/599; 524/602; 524/605; 524/607; 524/451
[58] Field of Search .............. 524/449, 451, 599, 602, 524/605, 607

[56] References Cited

U.S. PATENT DOCUMENTS

| | | | |
|---|---|---|---|
| 4,161,470 | 7/1979 | Calundann | 524/599 |
| 4,458,039 | 7/1984 | Gickman | 523/216 |
| 4,803,235 | 2/1989 | Okada | 524/605 |
| 4,806,586 | 2/1989 | Nakai | 524/449 |

FOREIGN PATENT DOCUMENTS 2124236 2/1984 United Kingdom .
2167513 5/1986 United Kingdom .

OTHER PUBLICATIONS

Molecular Crystals and Liquid Crystals, vol. 157, 1988, pp. 577–596, Gordon and Breach Science Pulbishers S.A., New York, U.S.; T. G. Ryan: "Modification of Main Chain LCP Processability and Properties".

*Primary Examiner*—Lewis T. Jacobs
*Assistant Examiner*—E. J. Webman
*Attorney, Agent, or Firm*—Burns, Doane, Swecker & Mathis

[57] ABSTRACT

Molding compositions, easily shaped into useful articles having improved mechanical properties that are less anisotropic, contain (a) a thermotropic polymer, and (b) an inorganic filler material, such inorganic filler (b) being a crystalline inorganic filler of platelet shape having a mean diameter ranging from 0.5 to 400 μm and a shape factor represented by the ratio:

$$\frac{\text{mean particle diameter in } \mu m}{\text{mean particle thickness in } \mu m}$$

which ranges from 10 to 90, and such inorganic filler (b) being present in an amount, expressed in % by weight of filler in the combined polymer+filler, ranging from 20% to 60%, with the proviso that such amount ranges from above 50% to 60% when the mean particle diameter of the filler material is less than 20 μm.

9 Claims, No Drawings

THERMOTROPIC POLYMER/INORGANIC REINFORCING FILLER MOLDING COMPOSITIONS

BACKGROUND OF THE INVENTION

1. Field of the Invention

The present invention relates to compositions that are moldable from the molten state into useful shaped articles and which comprise a thermotropic polymer and an inorganic reinforcing filler especially adapted to such thermotropic polymer. This invention also relates to the articles, per se, shaped from the subject compositions.

2. Description of the Prior Art

A progressively increasing interest in thermotropic polymers has been developing for about the last decade. This interest is associated with the fact that these polymers are capable of forming anisotropic melts which have a proper orientation and a relatively high degree of organization. Such orientation and organization also exist in the articles molded therefrom, providing them (even in the raw state) with improved mechanical properties (especially in respect of flexural modulus and strength), which are not usually observed in isotropic raw products. However, under certain circumstances, a disadvantage arises in objects molded from an anisotropic melt, namely, the imbalance (or anisotropy) between the longitudinal properties (in the direction of the melt flow, which is, for example, the direction of injection in the case of injection molding) and the transverse properties (in the direction perpendicular to that of the flow).

It is also known to this art to reduce the anisotropy of polymeric materials by the addition of inorganic fillers thereto.

SUMMARY OF THE INVENTION

Accordingly, a major object of the present invention is the provision of novel compositions comprising a thermotropic polymer and an especially adapted inorganic filler material therefor, which novel compositions are easily formed into useful shaped articles simultaneously exhibiting the following properties:

(i) the anisotropy ratio (AR), which is represented by the following ratio:

$$\frac{\text{longitudinal flexural modulus }(LM)}{\text{transverse flexural modulus }(TM)}$$

in which the moduli are measured under those conditions more fully described below, is reduced by at least 50% relative to that of the unfilled polymer, and (ii) the sum LM+TM is at least equal to 1.5 times the value of the same sum for the unfilled polymer.

The degree of reduction of the AR is calculated according to the following usual relationship:

$$\frac{AR \text{ of the unfilled polymer} - AR \text{ of the filled polymer}}{AR \text{ of the unfilled polymer}} \times 100$$

In order to produce shaped articles by molding, it is known that the use of excessively large amounts of fillers, e.g., greater than 60% by weight of filler relative to the combined polymer +filler, must be avoided, such that the fillers do not adversely affect the surface quality and the dimensional stability of the final shaped articles. It is also known that highly filled polymers have a viscosity which is too high in the molten state to permit accurate molding with a good reproduction of the cavity, if necessary.

Thus, another object of the present invention is the provision of novel compositions which can be formed into shaped articles in which the combination of properties noted above is obtained using amounts of fillers which remain below or equal to 60% by weight.

In EP-A-0,044,147 it has been proposed to reduce the anisotropy of thermotropic polymers by adding inert fibrillar fillers having an acicular shape such as, for example, short glass fibers or wollastonite. Nonetheless, it has now been found that the objectives related to anisotropy (AR and the sum LM+TM) and to the amount of filler, as described above, cannot be attained using such fillers.

It has now unexpectedly and surprisingly been found that it is possible to attain the combined objectives described above by virtue of the following judiciously selected compositions.

Briefly, the present invention features novel molding compositions which comprise:
(a) a thermotropic polymer, and
(b) an inorganic reinforcing filler,
said inorganic filler (b) being a crystalline inorganic filler of platelet shape having a mean diameter ranging from 0.5 to 400 μm and a shape factor represented by the ratio:

$$\frac{\text{mean particle diameter in } \mu m}{\text{mean particle thickness in } \mu m}$$

which ranges from 10 to 90; and said inorganic filler (b) being present in an amount, expressed in % by weight of filler in the combined polymer+filler, ranging from 20% to 60%, with the proviso that such amount ranges from a value above 50% up to 60% when the mean particle diameter of the filler material is less than 20 μm.

DETAILED DESCRIPTION OF THE PREFERRED EMBODIMENTS OF THE INVENTION

More particularly according to the present invention, exemplary thermotropic polymers suitable for incorporation into the subject compositions include the wholly aromatic polyesters, alkylaromatic polyesters, wholly aromatic polyesteramides, alkylaromatic polyesteramides, aromatic polyazomethines, aromatic polyester carbonates and mixtures of such polymers.

In a preferred embodiment of the invention, the thermotropic polymers which are used are wholly aromatic polyesters, wholly aromatic polyesteramides and mixtures of these polymers.

Wholly aromatic polyesters which are thermotropic, namely, which are capable of forming anisotropic melts, are described, for example, in U.S. Pat. Nos. 3,991,013, 3,991,014, 4,066,620, 4,075,262, 4,118,372, 4,130,545, 4,161,470, 4,181,792, 4,188,476, 4,219,461, 4,224,433, 4,230,817 and 4,346,208, in European Patent Application No. 86/420,013.4, published under No. 0,191,705, and in French Patent Application No. 87/10,177, filed July 10, 1987 by the assignee hereof, and all of the above are hereby expressly incorporated by reference.

Wholly aromatic polyesteramides which are thermotropic are described, for example, in U.S. Pat. Nos. 4,272,625, 4,330,457, 4,339,375 and 4,355,132, in European Patent Application No. 87/420,327.6, published under No. 0,272,992, and in French Patent Applications Nos. 87/10,177, 87/10,178 and 87/10,179, also hereby expressly incorporated by reference.

The thermotropic polymers suitable for use according to the present invention are those belonging to the aforementioned general or preferred classes, and have a flow temperature in the range of from 200° C. to 350° C. and, preferably, from 260° C. to 330° C. and an inherent viscosity equal to at least 0.5 dl g$^{-1}$ and preferably ranging from 1.0 to 4.0 dl g$^{-1}$. By "flow temperature" is intended the temperature at which the edges of a chip-shaped sample of polymer or of chopped fiber begin to become round; this temperature is determined by visual observation of the sample on a cover slip and at a suitable rate of temperature increase, generally on the order of 10° C. to 20° C. per minute, the observation being made with the aid of a microscope equipped with a heated stage, marketed under the trademark Thermopan. With regard to the inherent viscosity, it is measured at 25° C. in a solution containing 0.5 g of polymer per 100 cm$^3$ of a para-chlorophenol/1,2-dichloroethane solvent mixture (50/50 by volume).

Wholly aromatic thermotropic polyesters and polyesteramides which are very particularly preferred for the compositions of the present invention are those described in European Patent Applications No. 86/420,013.4 (published Under No. 0,191,705) and No. 87/420,327.6 (published under No. 0,272,992). These polyesters and polyesteramides have the following special characteristics:

(i) they contain recurring structural units of the formulae (I), (II), (III) and (IV), the presence of the units (II) being optional:

(I) represents the structure:

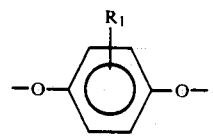

in which R$_1$ is a methyl or ethyl radical or a chlorine or bromine atom, with the proviso that the units (I) may be identical or different from each other;

(II) represents the structure:

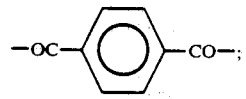

(III) represents the structure:

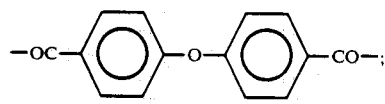

(IV) represents the structure:

in which the symbol A is an oxygen atom or the NH group;

(ii) the molar ratio of the units (I) relative to the sum of the units (II)+(III) ranges from 0.95 to 1.05;

(iii) the amount of the units (II) in the mixture of (II)+(III) ranges from 0 to 70 mol % and that of the units (III), relative to the same mixture, ranges from 100 to 30 mol %;

(iv) the amount of the units (IV), expressed relative to the amount of the units (I), ranges from 10 to 300 mol % in the case where A=0, and from 5 to 100 mol % in the case where A=NH.

In an even more particularly preferred embodiment of the invention, the aromatic polyesters and polyesteramides which can be incorporated into the subject compositions have a structure as described above, in which:

(a) the amount of the units (II) in the mixture of (II)+(III) ranges from 20 to 60 mol % and that of the units (III), relative to the same mixture, ranges from 80 to 40 mol %; and (b) the amount of the units (IV), expressed relative to the amount of the units (I), ranges from 30 to 200 mol % in the case where A=0, and from 10 to 60mol % in the case where A=NH.

Among the aromatic polyesters and polyesteramides according to such more particularly preferred embodiment of the invention, those which are representative are the polymers which have a structure in which the units (I) are identical, with the substituent R$_1$ being a methyl radical or a chlorine atom.

The very particularly preferred aromatic polyesters and polyesteramides described immediately above also include the polymers which may additionally contain in their structure aromatic units which generate ester and amide functional groups (dioxy units and/or dicarbonyl units and/or mixed oxy/carbonyl or secondary amino/-carbonyl units) which have a structure other than that of the units (I), (II), (III) and (IV), the total amount of these additional units being not more than 10 mol % relative to the amount of the units (I). Exemplary such additional units are the following:

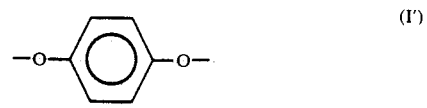

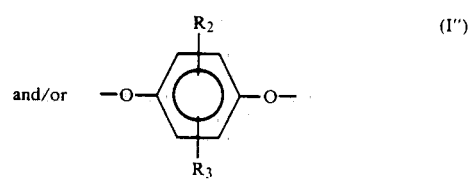

in which each of R$_2$ and R$_3$, which may be identical or different, has the same definition as R$_1$, with the proviso that the units (I″) may be identical or different from each other;

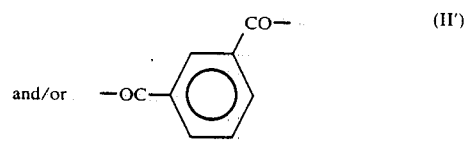

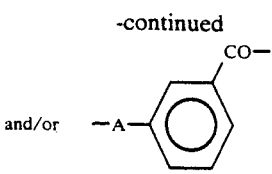 (IV')

in which the symbol A is as defined above with regard to the units (IV).

Another type of wholly aromatic thermotropic polyesters and polyesteramides, particularly preferred according to the present invention, includes the polymers described in U.S. Pat. Nos. 4,161,470 and 4,330,457 which have the following special characteristics:

With regard to the polyesters:

(i) they contain recurring structural units of the formulae (V) and (VI):

(V) represents the structure:

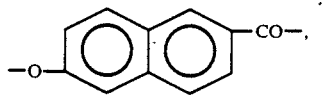

(VI) represents the structure:

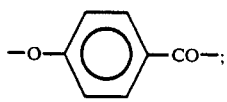

(ii) the amount of the units (V) in the mixture of (V)+(VI) ranges from 10 to 90 mol % and that of the units (VI), relative to the same mixture, ranges from 90 to 10 mol %;

With regard to the polyesteramides:

(iii) they contain recurring structural units of the formulae (VII), (VIII) and (IX):

(VII) represents the structure:

(VIII) represents the structure:

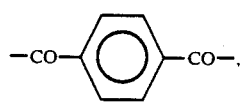

(IX) represents the structure:

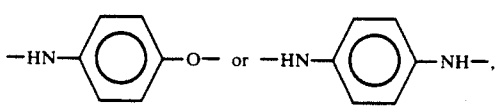

(iv) the amount of the units (VII) in the mixture of (VII)+(VIII)+(IX) ranges from 10 to 90 mol %, that of the units (VIII), relative to the same mixture, ranges from 5 to 45 mol %, and that of the units (IX), relative to the same mixture, ranges from 5 to 45 mol %.

Among the wholly aromatic polyesters and polyesteramides belonging to this other class of very particularly preferred polymers, representative are the polymers marketed by Celanese under the trademark Vectra, of the A 900 (polyester) or B 900 (polyesteramide) type.

Mica, natural talc, calcined talc or a mixture thereof, are particularly representative of crystalline inorganic fillers of platelet form, having a mean diameter ranging from 0.5 to 400 μm and having a shape factor which ranges from 10 to 90. These are preferably employed.

The mica used may belong to any one of the following groups and varieties: white mica, variety: especially muscovite, phengite and paragonite; black mica, variety: especially biotite and phlogopite; pink mica, variety: especially lepidolite. With regard to talc, having the chemical formula $Mg_3Si_4O_{10}(OH)_2$, this may, in particular, belong either to the ferriferous variety or to the nickeliferous variety. The inorganic filler according to the present invention may also be talc which has been subjected to a calcination treatment. This treatment entails heating the selected talc to a temperature of at least 500° C., preferably from 800° C. to 1,100° C., the operation being carried out in ambient air, under a nitrogen atmosphere or under a moist air atmosphere; the operation may be carried out in a static furnace, in a rotary furnace or in a flash calcination apparatus, over a period ranging, for example, from 2 hours to 5 hours.

The use of mica constitutes a particularly preferred embodiment of the invention. The use of black mica of the phlogopite variety for reinforcing the thermotropic polymer constitutes an even more preferred embodiment of the invention.

In the case of mica, generally used is a filler comprising flakes whose mean diameter ranges from 10 μm to 400 μm and, preferably, from 20 μm to 300 μm. In the case of talc, natural or calcined, generally used is a filler comprising particles whose mean diameter ranges from 0.5 μm to 100 μm and, preferably, from 1 μm to 15 μm. With regard to the shape factor, this preferably ranges from 30 to 90 in the case of mica, and from 10 to 30 in the case of talc, natural or calcined.

The amounts of inorganic reinforcing filler to be incorporated into the compositions according to the invention are those given above. It will be appreciated that the minimum limit of these amounts should be increased from 20% to a value above 50% and more preferably from 20% to 51% when the mean particle diameter is less than 20 μm (this is particularly the case when commercial talcs are used), such that the filler imparts the desired technical effect mentioned above. Highly satisfactory results in respect of anisotropy (AR and the sum LM+TM) are obtained using amounts of inorganic filler which preferably range from 20% to 50% by weight when the mean particle diameter is equal to or greater than 20 μm. In the case where this mean diameter is much smaller than 20 μm, such as a mean diameter of from 1 μm to 15 μm, the highly satisfactory results mentioned immediately above correspond to amounts of inorganic filler which preferably range from 55 to 60% by weight.

In a more particularly advantageous embodiment of the invention, a mica is used having a mean diameter of from 20 μm to 300 μm and a shape factor of from 30 to 90, such inorganic filler being incorporated in amounts ranging from 20% to 50% by weight.

In another advantageous embodiment of the invention, a natural talc is used having a mean diameter of from 1 μm to 15 μm and a shape factor of from 10 to 30, this inorganic filler being incorporated in amounts ranging from 55% to 60% by weight.

The compositions according to the invention may additionally include a coupling agent. This entails a measure which may be particularly advantageous in the case of the use of mica and/or of calcined talc. Such coupling agent is typically selected from among polyfunctional organosilicon compounds. These compounds contain at least one alkoxysilane group, Si—O—R$_4$, in which R$_4$ is a lower alkyl residue capable of bonding to the inorganic filler and at least one other group capable of bonding to the polymer. With the thermotropic polymers of the present invention, this other functional group may be an amino group or an epoxy group. Examples of suitable organosilicon compounds are $\gamma$-aminopropyltrimethoxysilane, $\gamma$-aminopropyltriethoxysilane, N-($\beta$-aminoethyl)-$\gamma$-aminopropyltrimethoxysilane, $\beta$-(3,4-epoxycyclohexyl)ethyltrimethoxysilane and $\gamma$-glycidoxypropyltrimethoxysilane.

The amount of coupling agent required to ensure a good bonding between the inorganic reinforcing filler and the base polymer is relatively small. An amount of only 0.1% of coupling agent relative to the weight of the filler may be sufficient. In general, amounts of coupling agent of from 0.3% to 4% are highly satisfactory.

The reinforced thermotropic polymer compositions according to the present invention may be formulated by a variety of known techniques.

The mixing of the various constituents may be carried out, for example, in two stages: a first stage in which the various constituents are stirred together at ambient temperature (23° C.) in a conventional powder mixer (which may be simply the feed hopper of an extruder), and a second stage, in which this premix is homogenized by hot blending at a temperature above 200° C. in a single- or multiscrew extruder. If need be, provision may be made, between these two stages, for conducting a variable degree of drying of the premix obtained upon completion of the first stage. After these treatments, the compositions of the inventions are generally converted into granules which will be employed subsequently for forming the desired shaped articles, the operation being carried out in conventional molding equipment.

In the case where a coupling agent is used, the latter may be incorporated in various ways into the mixture for preparing the compositions according to the invention: according to a first alternative embodiment, the coupling agent may be deposited beforehand on the filler which will be used to reinforce the polymer; according to a second alternative embodiment, the coupling agent may be deposited beforehand on the polymer before the addition of the filler; according to a third alternative embodiment, the coupling agent may be mixed directly with the polymer and the filler. In consideration of the above, the expression "various constituents", given above in connection with the method of preparation of the compositions according to the invention will mean: variant 1: pretreated inorganic filler+polymer; variant 2: inorganic filler+pretreated polymer; variant 3: polymer+inorganic filler+coupling agent.

The treatment using the coupling agent, when one is employed, is typically carried out by direct or progressive incorporation of the latter, in pure state or dissolved in a suitable solvent, into the filler (variant I), into the polymer (variant 2) or into the combined filler+polymer (variant 3). In the case of variant 1 in particular, it is possible to treat the filler by the technique of mixing in a fluidized bed or by the technique employing a high-speed mixer.

The polymeric compositions according to the invention may also be prepared by formulating a masterbatch, presented in the form of granules or of a dough based on a part of the polymer to be reinforced, of filler and, if desired, of a coupling agent, which will then be mixed before use with the granules or a dough of the remainder of the polymer to be reinforced.

The compositions according to the invention may additionally contain one or more additives such as, for example, pigments, stabilizers, nucleating agents, modifiers of flow characteristics and flame-retardant agents. The amounts of these additives which are incorporated generally do not exceed 40% of the weight of the polymer matrix.

The compositions according to the invention can subsequently be injection-molded according to the general practice employing known techniques and operating within the anisotropy range of the thermotropic polymer. It should be noted that the thermotropy is easy to demonstrate when the polymer is observed in the molten state in an optical system equipped with two crossed polarizers (90° angle): a birefringence and a transmission of polarized light through the crossed polarizers is produced in the case of the anisotropic samples. The demonstration of the anisotropy of the thermotropic polymers according to the present invention has been performed by the TOT thermooptical method described in French Patent No. 2,270,282. By "anisotropy range" is intended the temperature range which begins at the temperature at which the birefringence and the transmission of light through the two crossed polarizers appears and which is above the said temperature, a range which has a variable upper limit and in which the melt is anisotropic without any danger of polymer decomposition. In general, the anisotropic melts according to this invention have an anisotropy range extending over at least 30° C.

The shaped articles obtained exhibit at least the following two properties:

(i) the anistropy ratio (AR) is reduced by at least 50%; for example, a degree of reduction in AR of 67.7% may be attained with only 26.7% by weight of black mica of the phlogopite variety, marketed by Marietta under the trademark Suzorite 60S; and (ii) in addition, the sum LM+TM is equal to at least 1.5 times the value of the same sum obtained in the case of the unfilled polymer; for example, in the case of the particular filler referred to above, this sum is equal to 2.09 times the reference value.

In order to further illustrate the present invention and the advantages thereof, the following specific examples are given, it being understood that same are intended only as illustrative and in nowise limitative.

EXAMPLES 1 to 6 and Comparative Tests A-F

1. Description of the thermotropic polymer employed

An aromatic copolyester was prepared, of the type as that described in European Patent Application No. 86/420,013.4, published under No. 0,191,705.

The following reactants were introduced into a 7.5-liter polycondensation reactor, stirred and heat with a heat transfer fluid circulated through the jacket of the reactor, and equipped with a device for distillation and for purging with an inert gas:

| (1) | methylhydroquinone diacetate: | 1,456 g |
|---|---|---|
| | molar ratio (1)/(2) + (#) = 1; | |
| (2) | terephthalic acid: | 581 g |
| | 50 mol % in the mixture of (2) + (3); | |
| (3) | di(4-carboxyphenyl) ether: | 903 g |
| | 50 mol % in the mixture of (2) + (3); | |
| (4) | para-acetoxybenzoic acid: | 756 g |
| | 60 mol % relative to (1). | |

The reactor was purged with nitrogen and was then heated with the heat transfer fluid controlled at 260° C. for 2 hours and 20 minutes. The volume of acetic acid distilled off was 890 cm$^3$ (i.e., 85% of theory). The temperature of the heat transfer fluid was then progressively increased to 300° C. over 60 minutes, while the pressure was reduced from 1,010×10$^2$ Pa to 0.39×10$^2$ Pa over the same time period. After the distillation of acetic acid had ceased, the temperature was still maintained at 300° C. and the pressure at 0.39×10$^2$ for 39 minutes. The total volume of acetic acid collected was 1,040 cm$^3$ (i.e., 100% of theory).

The resulting polymer was grayish and fibrous in appearance. It had an inherent viscosity of 2.07 dl g$^{-1}$. Its flow temperature was 290° C. The anisotropy range was from 290° C. up to over 350° C.

2. Preparation of the compositions according to the invention

The thermotropic copolyester produced was employed to prepare various compositions filled with mica of various types, in variable proportions, which are reported in Table I given below.

The general operating procedure for preparing these compositions was the following:

The thermotropic polymer and the inorganic filler were brought into direct contact at ambient temperature, the operation being carried out in an Engelsmann Elte 650 roll mill. The micas used belong to the group of black mica, phlogopite variety; they are marketed by Marietta under the trade names:

(a) Suzorite 60S: the mean diameter was 280 μm and the shape factor was equal to 68;

(b) Suzorite 150S: the mean diameter was 150 μm and the shape factor was equal to 47; and (c) Suzorite 325S: the mean diameter was 22 μm and the shape factor was equal to 33.

The premix prepared using each of the above-mentioned micas was then dried in an oven heated to 16020 C. for 16 hours, under a reduced pressure of 1.33×10$^2$ Pa.

The oven-dried premix was then kneaded in the molten state in a Leistritz (trademark) extruder comprising two screws rotating in the same direction, having a diameter D equal to 34 mm and a length equal to 35×D. The profile of the screws was adapted for processing aromatic polyesters. The extruder was fitted with a die with a 4 mm diameter hole. The extruder conditions were the following:

| (i) | Die temperature: | 310° C.; |
|---|---|---|
| (ii) | Speed of rotation of the screws: | 200 revolutions/min |
| (iii) | Throughput of material: | approximately 10 kg/h. |

The product collected in rod form was cooled in ambient air and was then granulated and dried.

The granules obtained were used to prepare square plaques 100×100×2 mm in size, which were injection-molded. This molding was carried out with the aid of a Battenfeld (trademark) type BSKM 100/70 DS 2000 screw-piston machine under the following conditions:

| (a) | Material temperature: | 290° C., |
|---|---|---|
| (b) | Mold temperature: | 100° C., |
| (c) | Injection pressure: | 65 × 10$^5$ Pa, |
| (d) | Dwell pressure: | 25 × 10$^5$ Pa, |
| (e) | Injection cycle duration: | 30 s. |

The test specimens, whose shape and dimensions corresponded to those defined by the standard referred to below, were taken from the molded plaques produced in order to conduct flexure tests: the flexural modulus was measured at 23° C. on test specimens conditioned at 0 RH (zero % relative humidity) according to NF Standard T 51001 (the test specimens were placed in a desiccator over silica gel and were redried for 24 hours at ambient temperature at a reduced pressure of 0.67×10$^2$ to 1.33×10$^2$ Pa before the measurements were carried out). It should be noted that this mechanical property was measured on test specimens taken, on the one hand, lengthwise (injection or longitudinal direction) and, on the other hand, transversely (direction perpendicular to the injection). The results of the flexure tests are reported in Table I, which follows.

By way of comparative tests, the same operations as those described above were repeated, but:

(1) Test A: without employing any mineral filler and therefore without any premixing, (2) Tests B, C and D: using amounts of mica outside the range of values in accordance with the present invention.

By way of other comparative tests, the same operations as those described above were repeated, but this time employing, instead of the mica, a comparable amount:

(3) Test E: of glass fibers having a mean length of 4,500 μm and a mean diameter of 15 μm, marketed by Owens Corning Fiberglass under reference 429YZ; and (4) Test F: of wollastonite having a mean fiber length of 75 μm and a mean diameter of 25 μm, marketed by Paraisten Kalkkioy.

TABLE I

| EXAMPLE/TEST | NATURE OF THE FILLER | AMOUNT OF FILLER | |
|---|---|---|---|
| | | weight % | volume % |
| A | — | 0 | 0 |
| B | MICA 60 S | 10.7 | 5.7 |
| 1 | MICA 60 S | 26.7 | 15.4 |
| C | MICA 150 S | 11.0 | 5.9 |
| 2 | MICA 150 S | 29.6 | 17.4 |
| 3 | MICA 150 S | 44.5 | 28.6 |
| D | MICA 325 S | 9.7 | 5.1 |
| 4 | MICA 325 S | 24.6 | 14.0 |
| 5 | MICA 325 S | 40.7 | 25.5 |
| 6 | MICA 325 S | 48.2 | 31.8 |
| E | GLASS FIBER | 28.5 | 18.7 |
| F | WOLLASTONITE | 26.2 | 15.0 |

| | FLEXURAL MODULUS GPa | | | |
|---|---|---|---|---|
| EXAMPLE/TEST | LM | TM | Anisotropy ratio LM/TM | Sum LM + TM |
| A | 9.8 | 2.1 | 4.67 | 11.9 |
| B | 11.7 | 4.6 | 2.54 | 16.3 |
| 1 | 15.0 | 9.9 | 1.51 | 24.9 |
| C | 11.4 | 4.0 | 2.85 | 15.4 |
| 2 | 13.0 | 8.3 | 1.57 | 21.3 |
| 3 | 18.1 | 14.2 | 1.27 | 32.3 |
| D | 10.4 | 3.7 | 2.81 | 14.1 |
| 4 | 12.5 | 7.1 | 1.76 | 19.6 |
| 5 | 16.1 | 12.4 | 1.29 | 28.5 |

TABLE I-continued

| 6 | 18.5 | 14.3 | 1.29 | 32.8 |
|---|------|------|------|------|
| E | 11.1 | 5.4  | 2.06 | 16.5 |
| F | 10.1 | 3.6  | 2.81 | 13.7 |

LM = longitudinal flexural modulus
TM = transverse flexural modulus

EXAMPLE 7 and Comparative Tests G, H and I

The same operations as those described in Example 1 were repeated, but this time employing, instead of the thermotropic polymer in accordance with European Patent Application No. 86/420,013.4 produced from methylhydroquinone diacetate, the thermotropic polymer of the same type produced from chlorohydroquinone diacetate. The following reactants and catalysts were introduced into the reactor described in Example 1, paragraph 1:

| (1) | chlorohydroquinone diacetate: molar ratio (1)/(2) + (3) = 1; | 1,028 g |
|-----|---|---|
| (2) | terephthalic acid: 50 mol % in the mixture of (2) + (3); | 373 g |
| (3) | di(4-carboxyphenyl) ether: 50 mol % in the mixture of (2) + (3); | 581 g |
| (4) | para-acetoxybenzoic acid: 34 mol % relative to (1); | 275.5 g |
| (5) | magnesium acetate: 500 ppm. | 1.13 g |

The reactor was purged with nitrogen and was then heated with the heat transfer fluid controlled at 260° C. for 2 hours and 20 minutes. The volume of acetic acid distilled off was 506 cm$^3$ (i.e., 83% of theory). The temperature of the heat transfer fluid was then progressively increased to 330° C. over 40 minutes, while the pressure was reduced from $1,010 \times 10^2$ Pa to $0.39 \times 10^2$ Pa over the same time period. After the distillation of acetic acid had ceased, the temperature was still maintained at 330° C. and the pressure at $0.39 \times 10^2$ for 12 minutes, 30 seconds. The total volume of acetic acid collected was 602 cm$^3$ (i.e., 100% of theory). The resulting polymer was grayish and fibrous in appearance. It had an inherent viscosity of 1.4 dl g$^{-1}$. Its flow temperature was 290° C. The anisotropy range was from 290° C. to over 350° C.; and, instead of the mica, various amounts of natural talc marketed by Talcs de Luzenac under the trademark 15 M 00; the mean particle diameter was 8 μm and the shape factor was on the order of 20.

The amounts of talc used, which were within the range of values in accordance with the present invention in the case of Example 7, but which were outside this range in the case of tests H and I, and the mechanical properties of the articles produced are reported in Table II which follows. Also reported in this table are the results of the control test G conducted without using any talc.

TABLE II

| | AMOUNT OF TALC | | FLEXURAL MODULUS GPa | | | |
|---|---|---|---|---|---|---|
| EXAMPLE/TEST | weight % | volume % | LM | TM | Anisotropy ratio LM/TM | Sum LM + TM |
| G | 0 | 0 | 11.0 | 2.0 | 5.50 | 13.0 |
| H | 25 | 15 | 12.0 | 4.0 | 3.00 | 16.0 |
| I | 30 | 18 | 11.0 | 4.5 | 2.44 | 15.5 |
| 7 | 60 | 43 | 10.5 | 9.5 | 1.11 | 20.0 |

EXAMPLES 8 and 9 and Comparative Tests J and K

The same operations as those described above in Example 1 were repeated, but this time employing thermotropic polymers marketed by Celanese under the trademark Vectra:

Example 8: the polymer was of the A 900 type and was a polyester containing 6-oxy-2-naphthoyl (approximately 20 mol %) and para-oxybenzoyl (approximately 80 mol %) recurring units;

Example 9: the polymer employed was of the B 900 type and was a polyesteramide containing 6-oxy-2-naphthoyl, terephthaloyl and para-aminobenzoyl recurring units.

The inorganic filler employed in these two examples was black mica, phlogopite variety, marketed under the trade mark Suzorite 60S and the amounts in which it was used were in both cases equal to 40% by weight.

By way of comparative tests, the same operations were repeated, but without employing any inorganic filler; test J with the pure polymer of the A 900 type; and test K with the pure polymer of the B 900 type.

The mechanical properties of the shaped articles are reported in Table III which follows:

TABLE III

| EXAMPLE/ TEST | NATURE OF THE MICA | AMOUNT OF MICA | | FLEXURAL MODULUS GPa | | | |
|---|---|---|---|---|---|---|---|
| | | weight % | volume % | LM | TM | Anisotropy ratio LM/TM | Sum LM + TM |
| J | — | 0 | 0 | 10.7 | 2.9 | 3.69 | 13.6 |
| 8 | 60 S | 40 | 28.6 | 19.15 | 10.8 | 1.77 | 29.9 |
| K | — | 0 | 0 | 17.3 | 4.3 | 4.02 | 21.6 |
| 9 | 60 S | 40 | 28.6 | 26.9 | 13.8 | 1.95 | 40.7 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A moldable composition of matter, which comprises (a) a thermotropic polymer, and (b) an inorganic reinforcing filler material therefor, said inorganic filler (b) comprising a crystalline inorganic filler of platelet shape having a mean diameter ranging from 0.5 to less than 20 μm and a shape factor represented by the ratio:

$$\frac{\text{mean particle diameter in } \mu m}{\text{mean particle thickness in } \mu m}$$

which ranges from 10 to 90, and said inorganic filler (b) being present in an amount, expressed in % by weight of filler in the combined polymer+filler, ranging from above 50% to 60% which is effective to provide highly satisfactory results with respect to anisotropy.

2. The moldable composition as defined by claim 1, said thermotropic polymer comprising a wholly aromatic polyester, an alkylaromatic polyester, a wholly aromatic polyesteramide, an alkylaromatic polyesteramide, an aromatic polyazomethine, an aromatic polyester carbonate, or mixture thereof.

3. The moldable composition as defined by claim 2, said thermotropic polymer comprising a wholly aromatic polyester, wholly aromatic polyesteramide, or mixture thereof.

4. The moldable composition as defined by claim 1, said thermotropic polymer having a flow temperature ranging from 200° C. to 350° C. and an inherent viscosity equal to at least 0.5 dl g$^{-1}$.

5. The moldable composition as defined by claim 1, said platelet-shaped crystalline inorganic filler comprising mica, natural talc, calcined talc, or mixture thereof.

6. The moldable composition as defined by claim 5, said inorganic filler comprising mica.

7. The moldable composition as defined by claim 1, further comprising a polyfunctional organosilicon coupling agent containing at least one alkoxysilane group capable of bonding to the inorganic filler and at least one functional group capable of bonding to the polymer (a).

8. A molded shaped article comprising the composition of matter as defined by claim 1.

9. The molded shaped article as defined by claim 8, having an anisotropy ratio (AR) reduced by at least 50%, and wherein the sum of the longitudinal flexural modulus (LM) and the transverse flexural modulus (TM) is equal to at least 1.5 times the value of the same sum for the unfilled polymer.

* * * * *